RESISTANCE MEASURING BRIDGE HAVING AN AMPLIFICATION SYSTEM PROVIDING A SIGNAL FOR TERMINATING A MACHINING PROCESS

Filed April 6, 1967

United States Patent Office 3,548,303
Patented Dec. 15, 1970

3,548,303

RESISTANCE MEASURING BRIDGE HAVING AN AMPLIFICATION SYSTEM PROVIDING A SIGNAL FOR TERMINATING A MACHINING PROCESS

Walter Helgeland, Nashua, N.H., assignor to Sprague Electric Company, North Adams, Mass., a corporation of Massachusetts Filed Apr. 6, 1967, Ser. No. 628,911
Int. Cl. G01r *27/02, 1/30*
U.S. Cl. 324—62 5 Claims

ABSTRACT OF THE DISCLOSURE

When machining an electric circuit component, prompt triggering of machining termination is provided by bridge that compares changing impedance of component as it is machined, with standard impedance, the bridge output being connected to input of amplifier having input impedance of at least about 1000 megohms and can be full-floating. The output of the amplifier provides termination triggering signal preferably for electron beam or laser type machining as in machining high resistance resistors.

The present invention relates to the machining of electric circuit components such as resistors, inductors and capacitors.

Among the objects of the present invention is the provision of versatile triggering apparatus that will automatically and accurately trigger the termination of the machining even when effected at high speed, to make close tolerance products.

Figure 1:
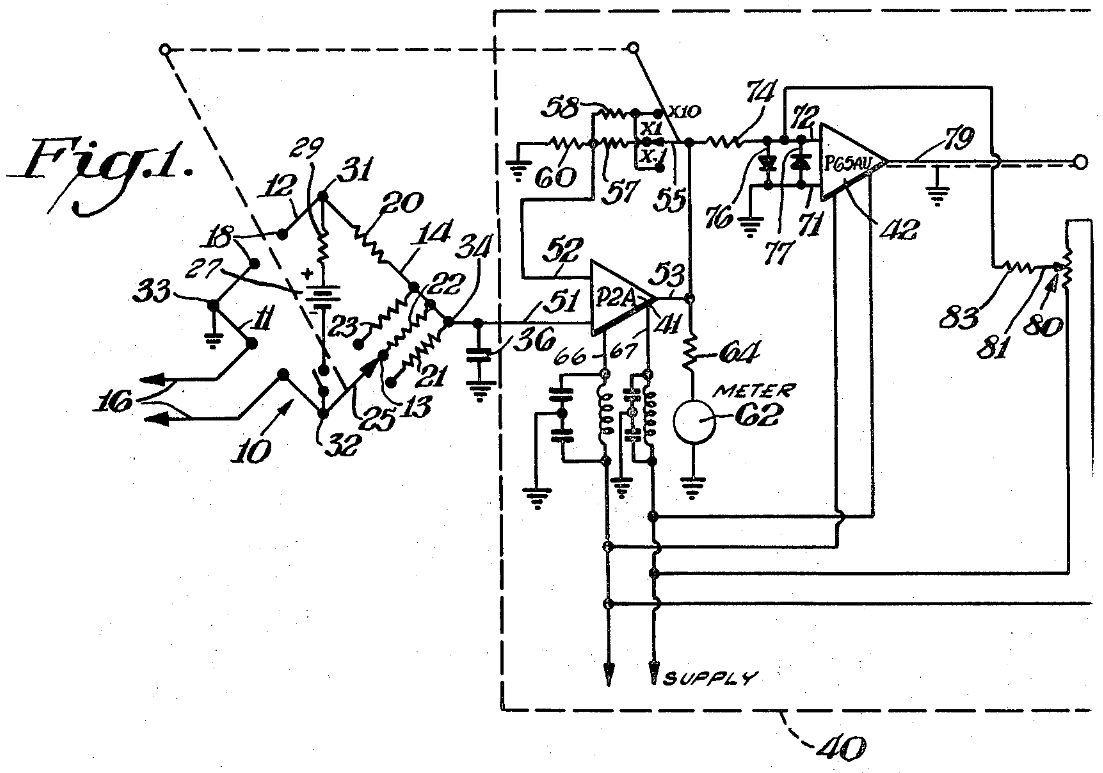
Figure 2:
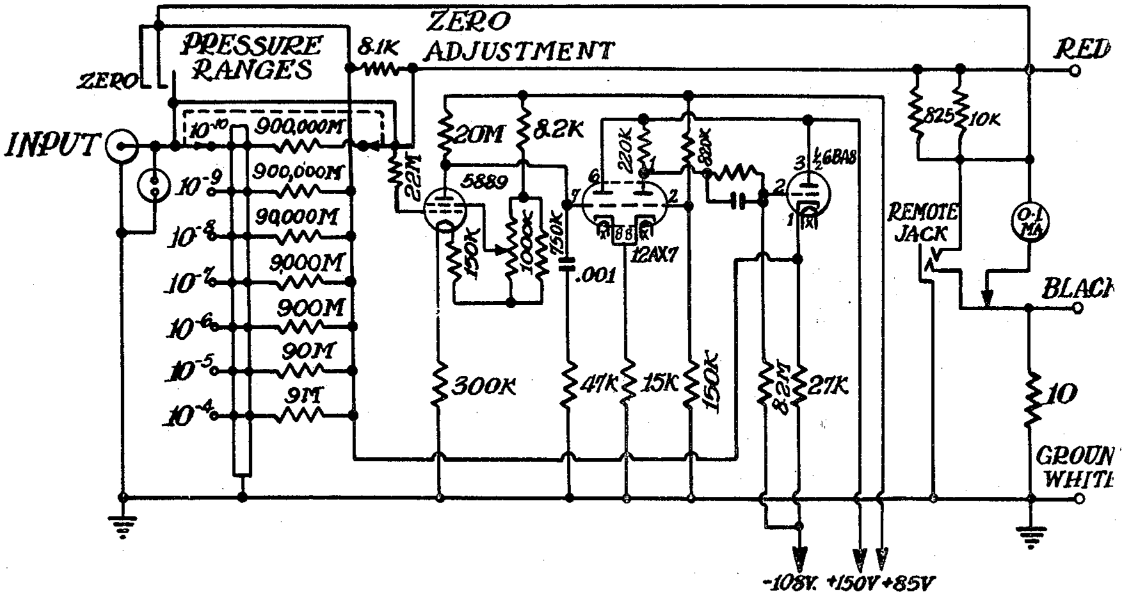

The foregoing as well as additional objects of the present invention will be more fully understood from the following description of several of its exemplifications, reference being made to the accompanying drawings wherein:

FIG. 1 is a circuit diagram of a triggering system for automatic termination of resistor machining pursuant to the present invention; and FIG. 2 is a circuit diagram of an alternative amplifier assembly that can be used in the combination of FIG. 1.

It has been discovered that very accurate high speed triggering of the termination of a circuit component machining operation is obtained with an amplification system having an input impedance of at least about 1000 megohms connected to the output of a bridge that compares the changing impedance of the component caused by the machining, with a standard impedance. The amplification system can deliver a triggering signal that terminates the machining, as by cutting off or deflecting an electron beam by which the machining is effected, or by disengaging a mechanical cutting wheel as in the mechanical helixing of resistors, or by deflecting a laser beam or laser beam generator used for machining.

While any amplification system having the foregoing high input impedance can be used, a differential amplifier with two inputs, one supplied by the bridge and the other receiving a fraction of the amplifier's output, is particularly desirable. Such a system enables a very stable and accurate setting of the amplification gain by merely selecting the fraction of the output that is fed to the second input.

The bridge can also have a selectable ratio with its input changed by the selection and the amplification gain controlled, as by adjustment of the fraction of a differential amplifier's output fed back to the second input, to compenate for the change in bridge output caused by the selection. In this way the amplifier's output can be directly and accurately read on a scale showing percentage deviation from standard of the impedance being machined.

The foregoing high input impedance is provided by many amplifiers, particularly those used to measure exceedingly small currents. Such amplifiers can have inputs that draw no more than $10^{-10}$ amperes. Some of the most desirable have inputs that float with respect to ground. The circuit component being machined can still have one of its terminals grounded.

The bridge is particularly effective when it is powered by a current source such as a battery that floats with respect to ground. A current source having a potential of at least about 50 volts is preferred, in order to provide a large output signal for the bridge.

Turning now to the drawings, the circuit of FIG. 1 has a bridge 10 with four arms 11, 12, 13 and 14. Arm 11 has leads 16 that are connected to the circuit component being machined, and arm 12 is provided with terminals 18 for receiving a standard impedance with which the machined component is to be compared. Arms 13 and 14 have impedances shown as resistors to complete the bridge and also provide it with a variable ratio. Thus a single resistor 20 is contained in arm 14, but arm 13 can have any one of three resistor 21, 22 or 23 selected by a selector switch 25. These three resistors and resistor 20 have predetermined ratios of resistance. By way of example, resistors 20 and 22 can both have 100,000 ohms resistance, resistor 21 10,000 ohms, and resistor 23 1,000,000 ohms. With such an arrangement the bridge will have a 1:1 ratio when switch 25 is in the illustrated position and will balance when the impedance being tested is equal to that of the standard. On the other hand, in either of the other positions of switch 25 the bridge will have a 1:10 or 10:1 ratio and balance when the unknown impedance is one-tenth (using resistor 21) or ten times (using resistor 23) that of the standard.

For the machining of resistors the bridge is energized by a 90-volt battery 27 that is not connected to anything else so that it floats with respect to ground. A current limiting resistance 29, of 1000 ohms for example, can be inserted in series in the energizing circuit to keep the battery from inadvertently discharging at too rapid a rate. The bridge energizing connections are to its upper and lower corners 31, 32, corner 33 being grounded and corner 34 connected to supply the bridge output to an amplification system 40 for conversion to a machining termination trigger. In some cases it may be desirable to capacitively couple corners 33, 34 as shown by capacitor 36. Such coupling should be at a low capacitance, not over about 1000 micromicrofarads, for example, and has been found helpful to avoid oscillation when machining resistors with an electron beam as described in U.S. Pat. 3,293,587 granted Dec. 20, 1967, or in U.S. patent applications Ser. No. 544,731 filed Apr. 25, 1966; Ser. No. 584,892 filed Oct. 6, 1966, now Pat. 3,422,386 issued Jan. 14, 1969; or Ser. No. 354,649 filed Mar. 25, 1964, now abandoned.

Amplification system 40 has a first amplifier 41 and a second amplifier 42. Amplifier 41 is of the differential type with two inputs 51, 52 and a single output 53 at which it develops an output signal that varies with the difference between the signals at its two inputs. Input 51 is connected to bridge output corner 34, and input 52 is connected to receive a fraction of the output signal of amplifier 41. A feedback arrangement for this purpose includes a selector switch 55 arranged to select one of two feedback resistors 57, 58 and a voltage-dividing resistor 60 which is grounded. There will accordingly be delivered to input 52 that fraction of the signal at output lead 53 determined by the ratio of the resistance of resistor 60 to the overall resistance from output lead 53 to ground. In the illustrated embodiment a meter 62 is also operated by the output at lead 53 and the meter can also be protected by a series-connected current-limiting resistor 64.

Power is supplied to amplifier 41 from power supply connections 66, 67 which are shown as heavily filtered as by means of 50 millihenry series chokes each bridged by a series-connected pair of 1/10 microfarad capacitors having their common junctions grounded.

Amplifiers 42 can be of the single ended input type or can be a differential amplifier with one input grounded, as indicated at 71. The signal-receiving input 72 of amplifier 42 is directly connected to output lead 53 of amplifier 41, but a current-limiting resistor 74 can also be inserted in this circuit. Oppositely polarized diodes 76, 77 are shown as bridged between leads 71, 72 and are useful for limiting the maximum signal voltage that can be developed across these leads, as for example where amplifier 42 may be damaged by higher input voltages.

A zero-adjusting circuit is also provided in the form of a potentiometer 80 connected between power supply connectors 66, 67 and having a movable arm 81 that takes a selected current of appropriate polarity and level and delivers it through a current-limiting resistor 83 to lead 72. Output lead 79 of amplifier 42 is connected to deliver the triggering signal that terminates the machining operation.

Amplifier 42 can be of the single ended input type or supply connectors 66, 67 used to power amplifier 41, but these amplifiers can be of entirely different character. It is important for the rapid development of the trigger output at lead 79 to have amplifier 42 of the type that responds very rapidly. By way of example, a response time of 100 microseconds or less is desirable. On the other hand, the output of amplifier 41 is of relatively slowly changing nature even for high speed machining, so that a response time of as much as 5 milliseconds would be perfectly suitable for amplifier 41. However, amplifier 41 should have its input lead 51 provide a very high resistance to ground and for this purpose is shown as having no ground return, although if desired it can have a ground return with a resistance of 1,000 megohms or more. Any electrometer amplifier, or one that is used to amplify exceedingly small currents of the order of $10^{-9}$ amperes, is suitable as amplifier 41. Input lead 51 should, for example, not draw more than about $10^{-10}$ amperes from the bridge output.

Resistors 57 and 58 are preferably so selected that depending upon the position of selector switch 55, they shift the magnitude of the feedback signal to lead 52 to compensate for the change in bridge output at lead 34 when the bridge changes its ratio. For convenience selector switches 25, 55 can be coupled together, as indicated, so that a change in ratio selection automatically compensates amplifier 41 so that it provides the same output at lead 53 when the bridge is balanced at any ratio.

The feedback circuit from lead 53 to lead 52 of amplifier 41 determines the gain of that amplifier so long as the maximum possible gain of amplifier 41 is not exceeded. Adjusting this feedback is a particularly desirable arrangement for controlling the gain of amplifier 41, this adjustment being completely independent of any internal drift of the amplifier.

Meter 62 can be conveniently of the zero center type and can have a scale marked off in percent deviation to thereby directly indicate how much the resistance of each machined resistor deviates from that of the standard.

In use bridge leads 16, 16 can be connected to terminals of the resistor before it is machined as by a helixing operation such as that described in U.S. Pat. 3,293,587 or abandoned U.S. patent application Ser. No. 354,649. When the appropriate standard resistance is inserted in the bridge and the remainder of the apparatus is operating as illustrated, the machining is begun and is carried out very rapidly. Even a machining speed so high that the machining is completed in a fraction of a second will produce in amplification system 40 a very sharp pulse at output lead 79 with so little delay that the machining will be terminated while the bridge is still well within 1/10% of exact balance. The pulse of lead 79 will, by way of example, be an abrupt change from about −10 volts to +10 volts, and can be used to cut off or deflect an electron beam that does the machining. Deflection is conveniently arranged as by providing the beam with an electrostatic deflection electrode directly connected to lead 79, and beam cutoff can be arranged by using the pulse to trigger a much higher flip-flop output at a bias level such that it will be suitable for the cutoff grid of an electron beam.

For some types of machining operations the timing of the triggering pulse at lead 79 requires adjustment. When machining with a mechanical cutting wheel, for instance, the inertia required to be overcome in disengaging the wheel from the resistor introduces a significant time delay so that potentiometer 80 is best adjusted to cause the trigger output to be developed by the time the bridge is still a few tenths of a percent from reaching balance. On the other hand, when machining with an electron beam there is extra current flow through the machined resistor caused both by the electron beam and secondary effects such as ion bombardment, which may cause the bridge to balance while the machine's resistor is still a few tenths of a percent from reaching the standard resistance value. In this arrangement it is desirable to adjust the potentiometer 80 so that it delays the development of the triggering output a corresponding amount.

FIG. 2 shows the details of a typical amplifier that can be used as amplifier 41 of FIG. 1. The amplifier of FIG. 2 has been marketed by the Aero-Vac Corporation in their residual gas analyzer model AVA–1. The azero adjustment on such an amplifier is an awkardness that can be minimized by connecting two such amplifiers into a differential pair with their outputs opposing each other. Still better operation is obtained by transistor type amplifiers such as that marketed by Philbrick Resesearches, Inc. as Model P2A.

Amplifiers with input impedances lower than 1000 megohms do not give very good results when used as the amplifier 41 in the combination of the present invention, particularly for machining high impedance circuit members. In such use the low impedance amplifiers reduce the magnitude of the bridge output so that additional amplification is necessary as well as much better shielding of the assembly from electrical noise and other interference. A similar undesired effect is produced if the bridge energizing voltage is dropped significantly below about 50 volts.

Amplifier 42 is not really needed inasmuch as the machining termination can be effected by the output of amplifier 41, particularly if that output is at a relatively high voltage. For example, amplifier 41 can be operated from a DC source at 100 volts or more and the amplifier's output can then be at a voltage close to 100.

When the triggering combination of the present invention is used with laser beam machining, the laser generator can be operated in a substantially inertia-free manner as by the scanning and cutoff techniques described in Research/Development Magazine issue of November 1966, pp. 34–35, or in Nerem Record- 1965, pp. 244–45. Alternatively the laser generator can be physically moved to effect the desired scanning or the generator can be held in fixed orientation like a cutting wheel and the work scanned across its beam.

Inductors can be machined like resistors as by helixing them from cylindrical rods coated with an electrically conductive layer. A high frequency current can then be used to energize the bridge. and the bridge resistors in arms 13, 14 can be retained or replaced by corresponding inductors. The amplifiers will then be of the type suitable for amplifying the AC output of the bridge, or that output can be rectified to DC.

Inductors can also be spiraled from a coating on a flat surface. One spiraling technique suitable for this purpose is described in U.S. patent application Ser. No. 622,995 filed Mar. 14, 1967, now Pat. 3,471,820.

Capacitors can be machined by the technique described in U.S. patent applications Ser. No. 584,892, now Pat. 3,422,386 or Ser. No. 544,731.

What is claimed:

1. A triggering system for promptly terminating the operation of an electron beam machining apparatus when a changing impedance reaches a predetermined value with respect to a standard impedance; said system having a direct current differential amplifier having an adjustable feedback resistor for variable gain settings together with a minimum input impedance of 1000 megohms; a DC bridge having a regulated DC voltage applied at its input terminals with one half of said bridge comprising said standard impedance connected in series with said changing impedance having an output terminal at the node between said standard impedance and said changing impedance with the other half of said bridge comprising a variable resistor in series with a resistor of predetermined value having an output terminal at the node between said variable resistor and known resistor, said bridge producing a DC voltage at said output terminals thereby comparing the changing impedance with the standard impedance; means for applying the bridge DC output voltage across said amplifier input; means connected to the output of the amplifier which respond to an appropriate amplifier DC output by producing a triggering signal; and adjusting means connected to said adjustable bridge resistor for adjusting said resistance whereby said adjustable resistor cooperates with said adjoining resistor of predetermined value to provide a predetermined ratio of resistance, the bridge being balanced when the other half achieves said predetermined ratio, said adjusting means being further connected to said feedback resistor in order to simultaneously change said feedback resistor, thereby adjusting the gain of the amplifier to compensate for the change in bridge output caused by the selection.

2. The combination of claim 1 in which the means with connecting means to the amplifier output is a high-speed second amplifier connected to terminate the action of an electron beam machining apparatus upon application of the appropriate first amplifier output.

3. An apparatus for accurately terminating the operation of an electron beam resistor machining device, said apparatus including a DC comparing bridge connected to compare a resistor as it is being machined, with a standard resistor, said bridge having a regulated DC voltage applied at its input terminals with one half of said bridge comprising said standard impedance connected in series with said machined resistor having an output terminal at the node between said standard impedance and said machined resistor with the other half of said bridge comprising a variable resistor in series with a resistor of predetermined value having an output terminal at the node between said variable resistor and known resistor with said bridge producing a DC voltage at said output terminals; a DC differential amplifier having an adjustable feedback resistor for various gain settings together with an input whose impedance is such that the input draws a current no greater than about $10^{-10}$ amperes, the input being connected to the output of the bridge; means for terminating the machining of a resistor when the machining causes the bridge to go through its balance point, said means being connected to the DC output of the amplifier; and adjusting means connected to said adjustable resistor for adjusting the resistance whereby said adjustable resistor cooperates with said adjoining resistor of predetermined value to provide a predetermined ratio of resistance, the bridge being balanced when the other bridge half achieves said predetermined ratio, the adjusting means being further connected to said feedback resistor in order to simultaneously change said feedback resistor, thereby adjusting the gain of the amplifier to compensate for the change in bridge output caused by the selection.

4. The combination of claim 3 in which the bridge is powered by a voltage source that floats with respect to ground.

5. The combination of claim 4 in which the voltage source is a battery of at least about 50 volts.

References Cited

UNITED STATES PATENTS

| | | | |
|---|---|---|---|
| 2,978,364 | 4/1961 | Blaustein | 324—62X |
| 3,179,248 | 4/1965 | Manley | 324—62X |
| 3,267,378 | 8/1966 | Barter | 324—123X |
| 3,388,461 | 6/1968 | Lins | 29—610 |
| 3,003,113 | 10/1961 | MacNichol, Jr. | 330—69 |
| 3,063,346 | 11/1962 | Lloyd et al. | 324—62UX |
| 3,290,479 | 12/1966 | Avedssian | 250—210X |
| 3,338,680 | 8/1967 | Martens | 324—65UX |
| 3,354,311 | 11/1967 | Vali et al. | 250—210X |
| 3,375,342 | 3/1968 | Robinson | 29—610X |
| 3,379,973 | 4/1968 | Walton | 324—62 |

EDWARD E. KUBASIEWICZ, Primary Examiner

U.S. Cl. X.R.

324—123; 330—69; 29—610

UNITED STATES PATENT OFFICE

CERTIFICATE OF CORRECTION

Patent No. 3,548,303 Dated December 15, 1970

Inventor(s) Walter Helgeland

It is certified that error appears in the above-identified patent and that said Letters Patent are hereby corrected as shown below:

Column 2, line 24, "resistor" should read -- resistors --
Column 3, line 8, "Amplifiers" should read -- Amplifier --
Column 3, line 26 should read -- is shown as powered by the same power --
Column 4, line 32, "azero" should read -- zero --
Column 4, line 37, "Resesearches" should read -- Researches
Column 5, lines 39 and 40 (Claim 2) should read -- connecte to the amplifier output is a high-speed second amplifier with connecting means t terminate the action --

Column 6, under "References Cited" insert -- Other Referenc "Stepping Switch, Bridge Amplifier, Automatic Production Testing", Electrical Design News, July 1958, pp. 20-21 --

SIGNED AND SEALED
MAR 16 1971

(SEAL)
Attest:

Edward M. Fletcher, Jr.
Attesting Officer

WILLIAM E. SCHUYLER, JR.
Commissioner of Patents

FORM PO-1050 (10-69)